United States Patent
Rudchenko et al.

(10) Patent No.: US 9,636,582 B2
(45) Date of Patent: May 2, 2017

(54) TEXT ENTRY BY TRAINING TOUCH MODELS

(75) Inventors: Dmytro Rudchenko, Bellevue, WA (US); Eric Norman Badger, Redmond, WA (US); Timothy Seung Yoon Paek, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1522 days.

(21) Appl. No.: 13/088,420

(22) Filed: Apr. 18, 2011

(65) Prior Publication Data

US 2012/0264516 A1 Oct. 18, 2012

(51) Int. Cl.
*A63F 9/24* (2006.01)
*A63F 13/422* (2014.01)
(Continued)

(52) U.S. Cl.
CPC ........ *A63F 13/422* (2014.09); *A63F 13/2145* (2014.09); *A63F 13/426* (2014.09); *A63F 13/46* (2014.09); *A63F 13/92* (2014.09); *G09B 13/00* (2013.01); *G09B 13/02* (2013.01); *A63F 13/214* (2014.09); *A63F 2300/1075* (2013.01); *A63F 2300/6027* (2013.01);
(Continued)

(58) Field of Classification Search
CPC .......... A63F 2009/24; A63F 2009/2401; A63F 2009/2402; A63F 2009/2404; A63F 2009/2405; A63F 2009/2408; A63F 2009/241; A63F 2009/2436; A63F 2009/2442; A63F 13/00; A63F 13/06; A63F 2300/1056; A63F 2300/1068; A63F 2300/1075; A63F 13/214; A63F 13/2145; A63F 13/218; H04M 1/20; H04M 1/247; H04M 1/27455; H04M 1/274558; H04M 11/066; H04M 2250/22
USPC ................ 463/1, 36, 37; 345/168, 169, 173; 715/716; 178/18.01, 18.03, 18.06; 710/73; 341/20, 27; 434/227–233; 379/185, 93.19, 916
See application file for complete search history.

(56) References Cited

U.S. PATENT DOCUMENTS 6,359,572 B1 3/2002 Vale
7,170,428 B2 1/2007 Himberg et al.
(Continued)

OTHER PUBLICATIONS

Yatani, et al., "SemFeel: A user interface with semantic tactile feedback for mobile touch-screen devices", Retrieved at <<http://khaitruong.com/publications/UIST-2009a.pdf>>, Oct. 4-7, 2009, pp. 10.
(Continued)

*Primary Examiner* — William H McCulloch, Jr.
*Assistant Examiner* — Chase Leichliter

(57) ABSTRACT

Embodiments present a game in which an ordered plurality of characters is presented for entry by a user with a touch screen, a physical keyboard, or other key input layout. The game advances to each successive character when the user presses the intended character or a character adjacent thereto. Contact areas are determined for each press, and in some embodiments the contact areas are overlaid on the keyboard. The contact areas are used to adjust user-specific touch models to improve text entry by the user. In some embodiments, the contact areas indicate areas for improvement by the user. Game completion statistics are calculated including speed and accuracy.

20 Claims, 8 Drawing Sheets

(51) Int. Cl.

| | | |
|---|---|---|
| A63F 13/46 | (2014.01) | |
| A63F 13/426 | (2014.01) | |
| A63F 13/92 | (2014.01) | |
| A63F 13/2145 | (2014.01) | |
| G09B 13/00 | (2006.01) | |
| G09B 13/02 | (2006.01) | |
| H04M 1/20 | (2006.01) | |
| A63F 13/214 | (2014.01) | |
| H04M 11/06 | (2006.01) | |
| H04M 1/2745 | (2006.01) | |

(52) U.S. Cl.
CPC ....... A63F 2300/6054 (2013.01); H04M 1/20 (2013.01); H04M 1/27455 (2013.01); H04M 1/274558 (2013.01); H04M 11/066 (2013.01); H04M 2250/22 (2013.01)

(56) References Cited

U.S. PATENT DOCUMENTS

| | | | |
|---|---|---|---|
| 7,363,224 B2 | 4/2008 | Huang et al. | |
| 7,649,478 B1 | 1/2010 | Yoon | |
| 8,508,481 B1* | 8/2013 | Landry | G06F 3/0418 345/168 |
| 8,599,152 B1* | 12/2013 | Wurtenberger | G06F 3/04895 345/168 |
| 8,997,191 B1* | 3/2015 | Stark | G06F 21/32 713/173 |
| 2004/0046742 A1* | 3/2004 | Johnson | G06F 3/04886 345/168 |
| 2004/0183833 A1* | 9/2004 | Chua | G06F 3/0237 715/773 |
| 2006/0050062 A1* | 3/2006 | Ozawa et al. | 345/173 |
| 2006/0066589 A1* | 3/2006 | Ozawa et al. | 345/173 |
| 2006/0066590 A1* | 3/2006 | Ozawa et al. | 345/173 |
| 2007/0296702 A1 | 12/2007 | Strawn et al. | |
| 2009/0303187 A1* | 12/2009 | Pallakoff | G06F 3/0488 345/169 |
| 2009/0328163 A1* | 12/2009 | Preece | G06F 21/36 726/5 |
| 2010/0123662 A1* | 5/2010 | Sadler | 345/169 |
| 2010/0259561 A1* | 10/2010 | Forutanpour | G06F 3/0216 345/660 |
| 2010/0289824 A1* | 11/2010 | Atzmon | G06F 3/04886 345/647 |
| 2010/0315266 A1 | 12/2010 | Gunawardana et al. | |
| 2011/0060984 A1* | 3/2011 | Lee | 715/261 |
| 2011/0148770 A1* | 6/2011 | Adamson et al. | 345/173 |
| 2011/0191516 A1* | 8/2011 | Xiong et al. | 710/305 |
| 2011/0304483 A1* | 12/2011 | Moon | 341/22 |
| 2012/0169613 A1* | 7/2012 | Armstrong | G06F 3/04886 345/173 |
| 2012/0203544 A1* | 8/2012 | Kushler | G06F 17/273 704/9 |
| 2013/0275907 A1* | 10/2013 | Lau | G06F 3/04886 715/773 |

OTHER PUBLICATIONS

Ouk, et al., "The design of khmer word-based predictive non-qwerty soft keyboard for stylus-based devices", Retrieved at <<http://ieeexplore.ieee.org/stamp/stamp.jsp?tp=&arnumber=4639091>>, IEEE Symposium on Visual Languages and Human-Centric Computing (VL/HCC), 2008, pp. 225-232.

"Amazon's Mechanical Turk", Retrieved at <<https://www.mturk.com>>, Retrieved Date: Jan. 21, 2011, p. 1.
Brewster, et al., "Tactile Feedback for Mobile Interactions", Retrieved at <<http://www.dcs.gla.ac.uk/~stephen/papers/CHI2007_brewster.pdf>>, Apr. 28-May 3, 2007, pp. 4.
Chao, Dennis, "Doom as an Interface for Process Management", Retrieved at <<http://citeseerx.ist.psu.edu/viewdoc/download;jsessionid=2D2EEFC827ADF36E4EB1ECE84EE3359A?doi=10.1.1.21.765&rep=rep1&type=pdf>>, Mar. 31-Apr. 4, 2001, pp. 6.
"Entertainment Software Association", Retrieved at <<http://www.theesa.com/facts/index.asp>>, Retrieved Date: Jan. 21, 2011, p. 1.
Evanini, et al., "Using Amazon Mechanical Turk for Transcription of Non-Native Speech", Retrieved at <<http://www.aclweb.org/anthology/W/W10/W10-0708.pdf>>, Proceedings of lhe NAACL HLT 2010 Workshop on Creating Speech and LAnguage Data with Amazon's Mechanical Turk, Jun. 2010, pp. 53-56.
Ahn, Luis Von, "Games with a Purpose", Retrieved at <<www.cs.cmu.edu/~biglou/ieee-gwap.pdf>>, Jun. 2006, p. 96-98.
Goodman, et al., "Language Modeling for Soft Keyboards", Retrieved at <<http://citeseerx.ist.psu.edu/viewdoc/download?doi=10.1.1.18.7614&rep=rep1&type=pdf>>, 2002, pp. 7.
Gunawardana, et al., "Usability Guided Key-Target Resizing for Soft Keyboards", Retrieved at <<http://research.microsoft.com/pubs/118375/paper-final.pdf>>, 15th International Conference on Intelligent User Interfaces, Feb. 7-10, 2010, pp. 111-118.
Kolsch, et al., "Keyboards without Keyboards: A Survey of Virtual Keyboards", Retrieved at <<http://citeseerx.ist.psu.edu/viewdoc/download?doi=10.1.1.18.9065&rep=rep1&type=pdf>>, Jul. 12, 2002, pp. 8.
Hoggan, et al., "Investigating the Effectiveness of Tactile Feedback for Mobile Touchscreens", Retrieved at <<http://www.dcs.gla.ac.uk/~stephen/papers/CHI2008_eve.pdf>>, Apr. 5-10, 2008, pp. 10.
Marge, et al., "Using the Amazon Mechanical Turk for Transcription of Spoken Language", Retrieved at <<http://ieeexplore.ieee.org/stamp/stamp.jsp?tp=&arnumber=5494979>>, 2010, pp. 5270-5273.
Oliver, et al., "MPTrain: A Mobile, Music and Physiology-based Personal Trainer", Retrieved at <<http://www.nuriaoliver.com/MPTrain/fp003-oliver.pdf>>, Sep. 12-15, 2006, pp. 8.
"SpeedType", Retrieved at <<http://itunes.apple.com/us/app/speedtype/id287255484?mt=8>>, Aug. 7, 2008, pp. 3.
Su, et al., "A Survey of Collaborative Filtering Techniques", Retrieved at <<http://downloads.hindawi.com/journals/aai/2009/421425.pdf>>, Hindawi Publishing Corporation Advances in Artificial Intelligence, 2009, pp. 1-19.
"Turbo Type—The Typing Game to Type Fast", Retrieved at <<http://itunes.apple.com/app/turbo-type-the-typing-game/id374229839?mt=8>>, Retrieved Date: Jan. 21, 2011, pp. 2.
"TypeFast Typing Tutor for the iPad", Retrieved at<<http://itunes.apple.com/us/app/typefast-typing-tutor/id325348330?mt=8>>, Retrieved Date: Jan. 21, 2011, pp. 2.
Ahn, et al., "Designing Games with a Purpose", Retrieved at <<http://www.cs.cmu.edu/~biglou/GWAP_CACM.pdf>>, vol. 51, No. 8, Aug. 2008, pp. 58-67.
Ahn, et al., "Labeling Images with a Computer Game", Retrieved at <<http://www.cs.cmu.edu/~biglou/ESP.pdf>>, Apr. 24-29, 2004, pp. 8.
"Windows 7 Speech Recognition Tutorial", Retrieved at <<http://www.microsoft.com/enable/training/windowsvista/srtrain.aspx>>, Retrieved Date: Jan. 21, 2011, pp. 2.
"User-centric soft keyboard predictive technologies", U.S. Appl. No. 12/729,130, filed Mar. 22, 2010, pp. 1-50.
"Real-time typing assistance", U.S. Appl. No. 12/753,744, filed Apr. 2, 2010, pp. 1-55.

* cited by examiner

TEXT ENTRY BY TRAINING TOUCH MODELS

BACKGROUND

Typing text on small physical or virtual keyboards is difficult and can be frustrating for users. Existing systems use touch models to correlate various contact areas or touch points with particular intended characters and to resize particular keys. For example, the user may consistently press one side of the "a" character rather than the center of the "a" character. The touch model then correlates that portion of the "a" character with an intended "a" press. To perform accurately, the touch models require sufficient input data from the user for training. Existing systems for improving touch models, however, focus on training the user to alter key press locations by advancing through a series of characters only when the user presses the correct character. Further, the existing systems generally fail to identify particular areas of improvement for the user.

SUMMARY

Embodiments of the disclosure conduct a game to obtain data to train a touch model associated with a computing device. A key input layout is displayed to a user in a first partition of a touch screen of a computing device. An ordered plurality of characters is displayed in a second partition of the touch screen or otherwise provided to the user. Each of the ordered plurality of characters has a portion of the displayed keyboard associated therewith. A sequence of touch screen inputs is received from the user. Each of the sequence of touch screen inputs is intended by the user to correspond to one of the displayed ordered plurality of characters. A contact area associated with each of the received touch screen inputs is determined. Each determined contact area is compared to the portion of the displayed keyboard associated with the corresponding character in the ordered plurality of characters. A user-specific touch model associated with the computing device and/or the user is defined based on the comparison. In some embodiments, the key input layout is a physical keyboard (e.g., no touch screen) and the ordered plurality of characters is provided via computer-generated speech.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable the collection of input data from users 104 to train touch models 116 and to improve text entry for the users 104 on touch screen keyboards. Some embodiments include a downloadable, installable application that executes as a game to present an ordered plurality of characters to the user 104 for entry. Contact areas are determined for each press by the user 104, and the game advances through each of the characters when the user 104 presses the correct character or an adjacent character. By advancing to the next character when an adjacent character is pressed, aspects of the disclosure collect natural touch points from the user 104.

Aspects of the disclosure enable collection of user input and determination of contact areas to improve touch modeling. Embodiments are also applicable to any key input layout including traditional (e.g., QWERTY) keyboards, non-traditional (e.g., non-QWERTY) keyboards, 12-key numeric layouts, reduced soft input panels (SIPs), and any other arrangement and representation of characters. Aspects of the disclosure are operable with any language.

Figure 1:
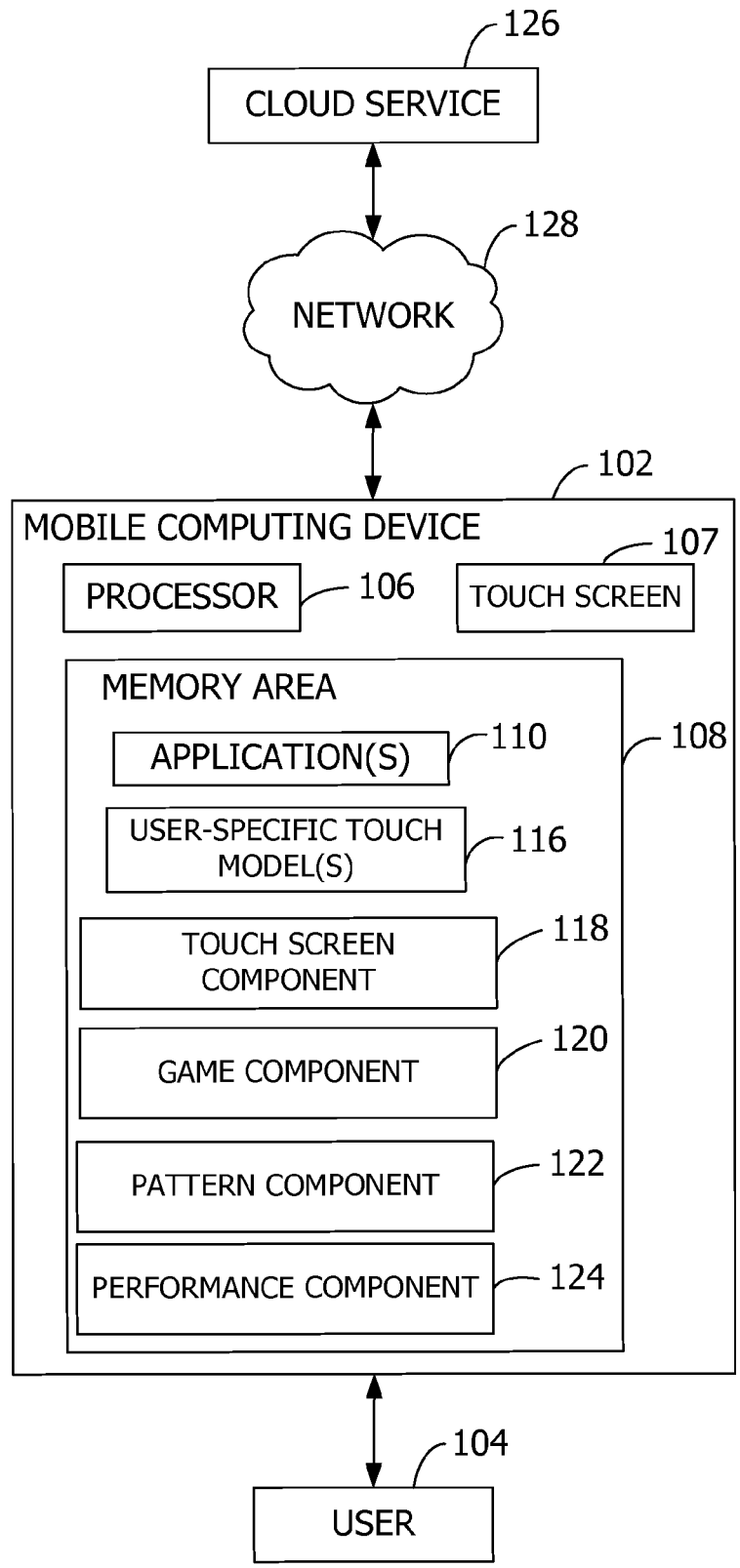
FIG. 1 is an exemplary block diagram illustrating a mobile computing device conducting a game to obtain data to train a user-specific touch model.

Referring next to FIG. 1, an exemplary block diagram illustrates a mobile computing device 102 conducting a game to obtain data to train a user-specific touch model 116. While FIG. 1 illustrates a mobile computing device, aspects of the disclosure are operable with any computing device, and is not limited to mobile computing devices. Exemplary computing devices operable with embodiments of the disclosure include, but are not limited to, a wall computing or a vision based system, as well as the exemplary computing devices next described.

The mobile computing device 102 represents any device executing instructions (e.g., as application programs, operating system functionality, or both) to implement the operations and functionality associated with the mobile computing device 102. The mobile computing device 102 may be any portable device. In some embodiments, the mobile computing device 102 includes a mobile telephone, laptop, tablet, computing pad, netbook, gaming device, and/or portable media player. Alternatively, aspects of the disclosure are operable with less portable devices such as desktop personal computers, kiosks, and tabletop devices. Additionally, the mobile computing device 102 may represent a group of processing units or other computing devices.

In the example of FIG. 1, the mobile computing device 102 is associated with the user 104 and has at least one processor 106, a memory area 108, and at least one user interface including a touch screen 107. The processor 106 includes any quantity of processing units, and is programmed to execute computer-executable instructions for implementing aspects of the disclosure. The instructions may be performed by the processor 106 or by multiple processors executing within the mobile computing device 102, or performed by a processor external to the mobile computing device 102. In some embodiments, the processor 106 is programmed to execute instructions such as those illustrated in the figures (e.g., FIG. 2).

The mobile computing device 102 further has one or more computer readable media such as the memory area 108. The memory area 108 includes any quantity of media associated with or accessible by the mobile computing device 102. The memory area 108 may be internal to the mobile computing device 102 (as shown in FIG. 1), external to the mobile computing device 102 (not shown), or both (not shown).

The memory area 108 stores, among other data, one or more applications 110. The applications 110, when executed by the processor 106, operate to perform functionality on the mobile computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network 128. For example, the applications 110 may represent downloaded client-side applications that correspond to server-side services executing in a cloud.

Aspects of the disclosure may be embodied as one or more of the applications 110. For example, embodiments of the disclosure include a mobile application downloadable from an application marketplace. Upon download, the user 104 executes the mobile application to at least perform the functionality illustrated in FIG. 2.

The memory area 108 further stores one or more user-specific touch models 116. In some embodiments, the user-specific touch models 116 are associated with the user 104 and with the mobile computing device 102. The touch models 116 may represent a probability distribution over likely touch points mapped to keys or characters given an intention to press a particular character.

The memory area 108 further stores one or more computer-executable components. Exemplary components include a touch screen component 118, a game component 120, a pattern component 122, and a performance component 124. Operation of the computer-executable components is described below with reference to FIG. 2.

The touch screen 107 of the mobile computing device 102 receives input from, and provides output to, the user 104. The touch screen 107 may represent a small portion of the mobile computing device 102, or may consume a significant portion of one or more sides of the mobile computing device 102. The touch screen 107 may be any touch screen having capacitive and/or resistive touch sensors.

In some embodiments, the mobile computing device 102 communicates with a cloud service 126 via the network 128 such as the Internet. For example, the mobile computing device 102 sends data collected during execution of the game to the cloud service 126 for analysis. In another example, the mobile computing device 102 receives touch models 116 and other data from the cloud service 126, such as touch models 116 based on crowd-sourced data that are pushed to a plurality of the mobile computing devices 102 (e.g., as an update to existing touch models 116).

Figure 2:
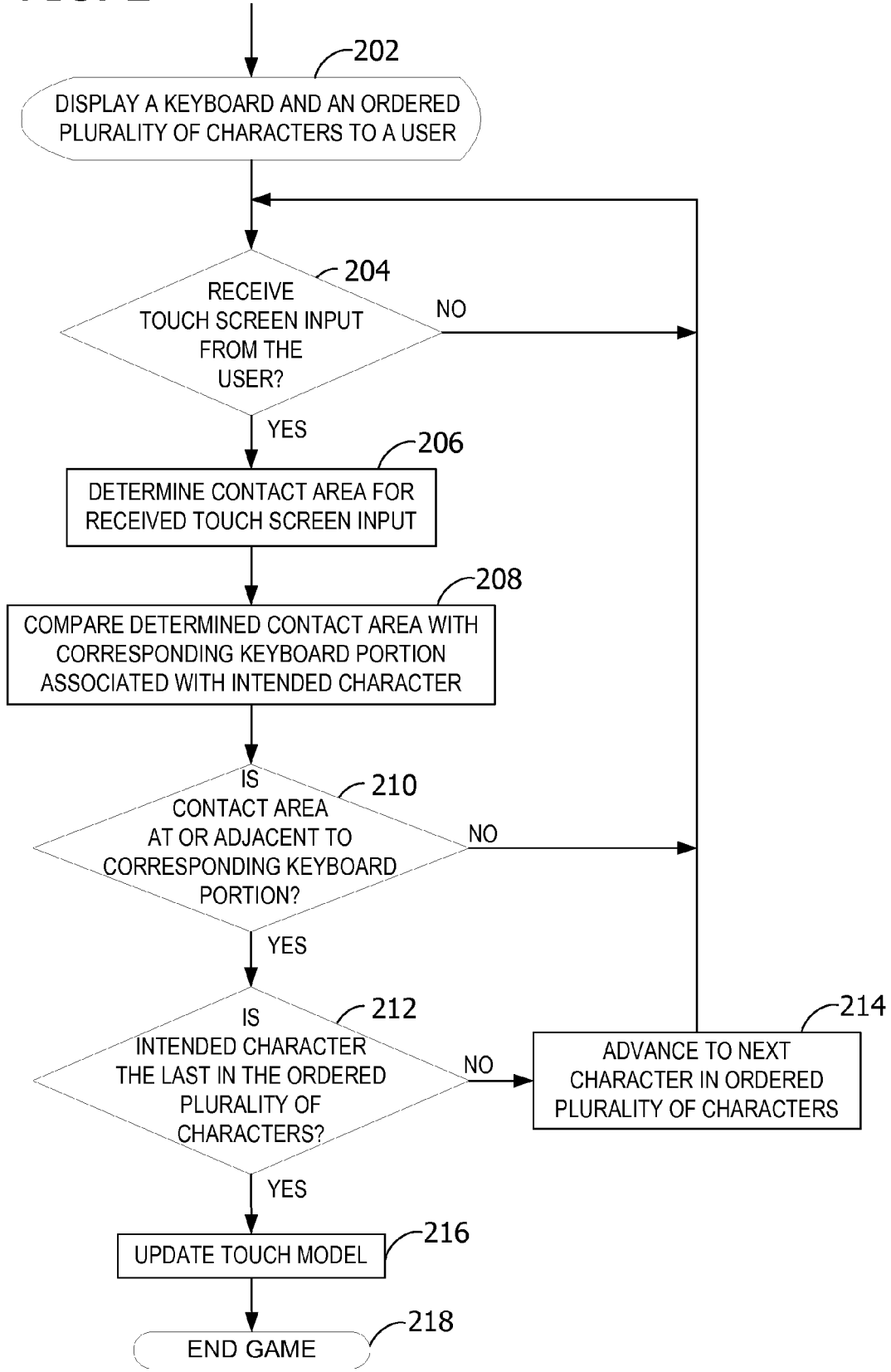
FIG. 2 is an exemplary flow chart illustrating operation of a mobile computing device to determine contact areas of touch screen inputs by a user as the user advances through an ordered plurality of characters.
Figure 3:
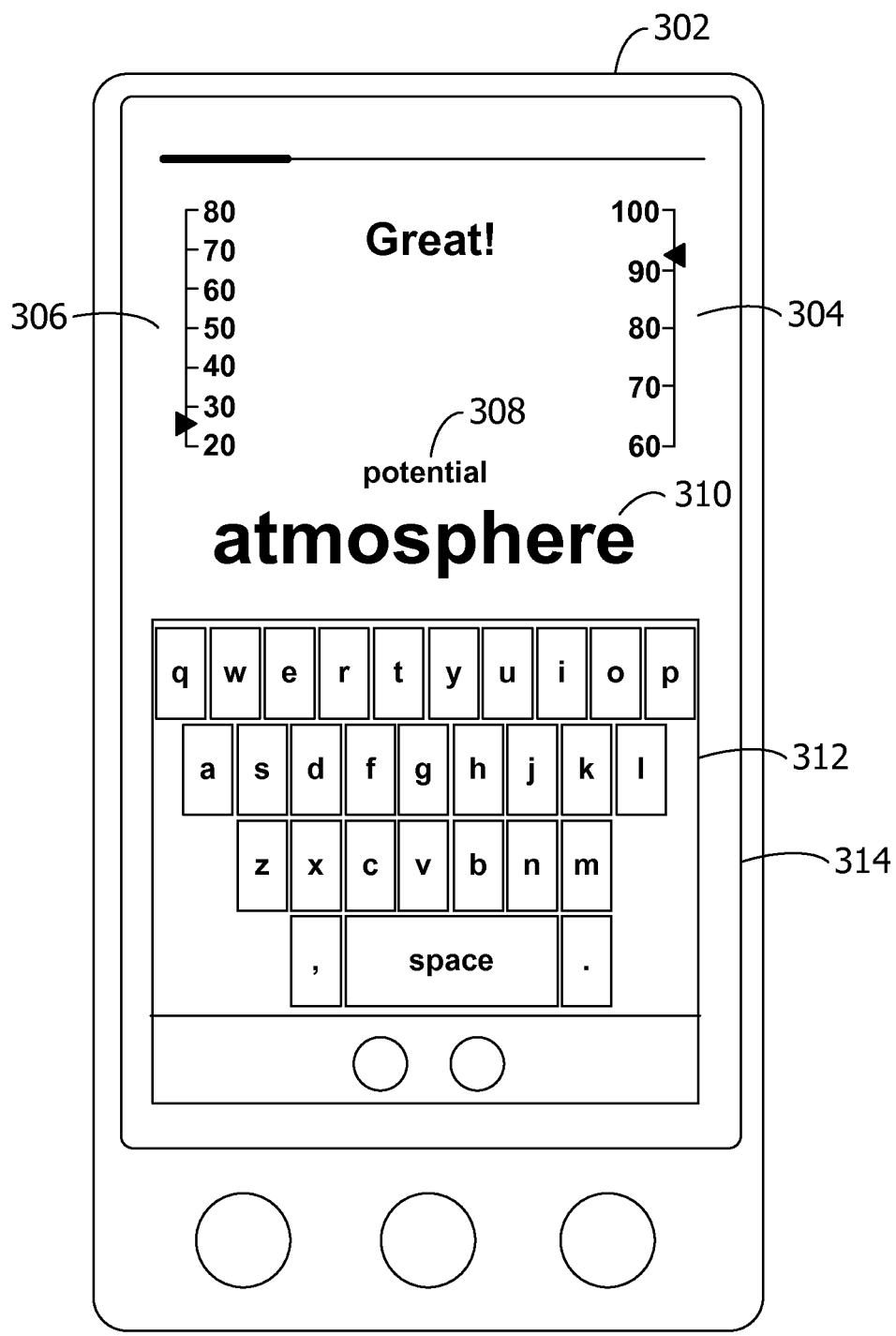
FIG. 3 is an exemplary mobile computing device with a touch screen illustrating operation of a game for obtaining touch screen input data from a user.

Referring next to FIG. 2, an exemplary flow chart illustrates operation of the mobile computing device 102 to determine contact areas of touch screen inputs by the user 104 as the user 104 advances through an ordered plurality of characters. In the example of FIG. 2, the touch screen 107 is divided into several partitions or areas. An example of the touch screen 107 of the mobile computing device 102 is illustrated in FIG. 3. At 202, a virtual, or touch screen, keyboard is displayed to the user 104 in a first partition of the touch screen 107 of the mobile computing device 102. Additionally, an ordered plurality of characters is displayed in a second partition of the touch screen 107. Each of the ordered plurality of characters has a portion of the displayed keyboard associated therewith. For example, each character in the second partition has a corresponding character available in the first partition (e.g., a symbol on the keyboard). In some embodiments, a key or button in the displayed keyboard corresponds to one character. Alternatively or in addition, a key in the displayed keyboard corresponds to a plurality of characters. For example, a 12-key input layout has a single key or button corresponding to multiple characters.

In some embodiments, the ordered plurality of characters comprises one or more of the following: a word, a phrase, a sentence, symbols, graphic elements, abbreviations, and emoticons (e.g., a smiley face). The characters may be numeric and/or alphabetic in some embodiments. In general, the ordered plurality of characters includes any symbols assigned to the keys of the keyboard. Further, the ordered plurality of characters may be provided to the user 104 by means other than a display. For example, a text-to-speech generator may speak or otherwise convey the ordered plurality of characters to the user by sound.

The mobile computing device 102 receives a sequence of touch screen inputs from the user 104. Each of the touch screen inputs is intended by the user 104 to correspond to one of the displayed, ordered plurality of characters. For example, the user 104 types in a displayed word, phrase, or sentence. For each received touch screen input, the mobile computing device 102 processes the touch screen input.

In some embodiments, the mobile computing device 102 provides entry characteristics to the user 104 for providing the sequence of touch screen inputs. The entry characteristics describe how the user 104 should hold or use the mobile computing device 102 when entering data to enable aspects of the disclosure to learn contextual touch models. Exemplary entry characteristics include, but are not limited to, one or more of the following: one finger input, two finger input, input while walking, input while sitting, and input while standing.

As an example, if the mobile computing device 102 receives a touch screen input from the user 104 at 204 (e.g., receives a finger press), the mobile computing device 102 determines the contact area associated with the received touch screen input at 206. For example, the mobile computing device 102 determines the contact area by determining one or more of the following: an X-Y coordinate, a shape of a contact surface, a pressure reading, a key down event corresponding to a finger press, and a key up event corresponding to a finger release. However, other contact area calculations are within the scope of the disclosure.

Aspects of the disclosure may also be used for shape writing training (e.g., training a shape writing language model). For example, the user 104 tries to swipe words as quickly as possible while embodiments of the disclosure build up a database of touch information that corresponds to the words.

The mobile computing device 102 compares the determined contact area to the portion of the displayed keyboard associated with the corresponding character in the ordered plurality of characters at 208. In some embodiments, the comparison determines a distance between the intended contact area and the actual determined contact area. In this manner, the mobile computing device 102 is able to calculate an accuracy.

If the determined contact area is at, or adjacent to, the corresponding keyboard portion at 210, and if the current character is not the last character displayed at 212, the mobile computing device 102 advances to the next character at 214. For example, the current character may disappear, get smaller, change colors, animate, unbold, or otherwise shift the focus of the user 104 to the next character in the ordered plurality of characters. Similarly, the mobile computing device 102 visually distinguishes the next character in the ordered plurality of characters to attract the attention and focus of the user 104. For example, the next character may get larger, change colors, animate, bold, or otherwise attract the attention of the user 104. The mobile computing device 102 then waits for another touch screen input from the user 104.

In some embodiments, the mobile computing device 102 determines whether the contact area is at, or adjacent to (e.g., the user 104 hits one of the surrounding keys), the corresponding keyboard portion by comparing a linear distance between the contact area (e.g., a center thereof) and the corresponding keyboard portion (e.g., a center or other point therein) with a threshold distance. If the distance is less than or otherwise satisfies the threshold distance, then the mobile computing device 102 determines that the contact area is at, or adjacent to, the corresponding keyboard portion. If the distance is greater than or otherwise violates the threshold distance, then the mobile computing device 102 determines that the contact area is not close enough to the corresponding keyboard portion.

The threshold distance may be set by one or more of the following: the user 104, a manufacturer of the mobile computing device 102, a touch screen provider, an operating system provider, or other entity. For example, the threshold distance may be set based on the distance between characters on the keyboard. In such an example, if the letter "d" is the current character, the game advances to the next character if the user 104 touches "d" or any character surrounding "d" (e.g., "w," If the determined contact area is not at, or not adjacent to, the corresponding keyboard portion at 210, the mobile computing device 102 proceeds to wait for another touch screen input. That is, the game does not advance to the next character in the ordered plurality of characters.

If the current character is the last character in the ordered plurality of characters at 212, the user 104 has completed the game at 218. The mobile computing device 102 may apply knowledge of the ordered plurality of characters, touch screen inputs, and determined contact areas to create, define, improve, customize, or otherwise alter the user-specific touch model 116 at 216. For example, the mobile computing device 102 may update the user-specific touch model 116 based on the determined contact areas of the touch screen inputs (e.g., adjust a center of the intended characters based on the corresponding determined contact areas). The touch model 116 is altered based on data of the form <key, touch point> where <key> represents the correct, intended character and <touch point> represents the contact area pressed by the user 104 when attempting to press <key>.

In some embodiments, the mobile computing device 102 may modify a generic touch model 116 associated with the particular mobile computing device 102 model number. In this example, the generic touch model 116 is specific to the particular mobile computing device 102 model and applicable to all users 104 of the mobile computing device 102. After the user 104 plays the game, however, the generic touch model 116 becomes customized to the user 104 as described in the operations illustrated in FIG. 2.

Alternatively or in addition, the mobile computing device 102 may calculate and display statistics about the user's performance in the game. For example, the mobile computing device 102 may calculate an accuracy of the received touch screen inputs. The accuracy is determined based on the comparison between the determined contact area and the corresponding keyboard portion associated with the intended or current character. In another example, the mobile computing device 102 may calculate a speed based on receipt times of the touch screen inputs. In some embodiments, the speed calculation may further be based on, or compared to, the calculated accuracy.

In some embodiments, the mobile computing device 102 shares the game completion statistics and other data with the cloud service 126 for analysis. For example, the mobile computing device 102 sends or identifies game completion statistics such as the ordered plurality of characters, the corresponding determined contact areas, the calculated speed, and/or the calculated accuracy to the cloud service 126. Additional data sent may include configuration information such as hardware information (e.g., mobile computing device make/model and touch-controller information), screen size and resolution, color themes (e.g., light vs. dark), contrast, font size, key size, orientation (e.g., portrait vs. landscape), sensor input (e.g., accelerometer readings), and/ or whether the user 104 is using one or two fingers, two thumbs, two fingers, etc. The cloud service 126 aggregates the game completion statistics from a plurality of the mobile computing devices 102. The aggregated data represents crowd-sourced data that spans multiple devices and multiple users. The cloud service 126 analyzes the aggregated crowd-sourced data to provide each user 104 with feedback on the typing speed and accuracy compared to other users 104.

The cloud service 126 may further analyze the aggregated crowd-sourced data to determine, for example, an aggregate speed and an aggregate accuracy per make and model of the plurality of mobile computing devices 102. Alternatively or in addition, the cloud service 126 analyzes the aggregated crowd-sourced data to identify problems per make and model of the plurality of mobile computing devices 102. The cloud service 126 may also identify characteristics of the users 104 associated with particular errors. For example, users 104 with large hands may make similar errors. Aspects of the disclosure may then adjust the touch model 116 for users 104 with those characteristics.

Some embodiments of the disclosure operate to optimize, improve, or otherwise adjust the key input layout based on performance of the user 104 during the game. For example, the key input layout represents a first key input layout and the user-specific touch model represents a first touch model corresponding thereto. The first key input layout may be altered or replaced with a second key input layout (e.g., an ergonomic or curved layout), and a second touch model may be learned based on operation of the game operations described herein for the second key input layout. Performance of the first key input layout and the second key input layout may be compared (e.g., compare the speed and accuracy of the user 104 with each key input layout). The key input layout with the better performance (e.g., faster speed and/or higher accuracy) may be selected, or a third key input layout may be created using characteristics of the key input layout having the better performance. In this manner, an optimal key input layout may be defined.

When the user 104 decides to play another round of the game, the mobile computing device 102 accesses the game completion statistics from one or more of the previous rounds to select the next ordered plurality of characters to display. In some embodiments, the cloud service 126, rather than the mobile computing device 102, selects the next ordered plurality of characters to display. For example, the next ordered plurality of characters may be selected based on the calculated accuracy or calculated speed. In one such example, one or more of the characters may be selected based on a determination that the user 104 had a low accuracy or slow speed with these characters. Selecting the ordered plurality of characters in this way enables the user 104 to work on and improve accuracy and speed. In another example, the ordered plurality of characters may be selected based on the determined contact area. In one such example, if the user 104 had contact areas for a particular character that were not consistently located, the mobile computing device 102 selects an ordered plurality of characters that includes the particular character to allow the user 104 to work on consistently hitting the intended area. In still another example, the ordered plurality of characters may be selected based on a desire by the mobile computing device 102 and/or the cloud service 126 to collect data regarding particular characters or patterns of characters.

In some embodiments, the computer-executable components illustrated in FIG. 1 execute to implement the operations illustrated in FIG. 2. For example, the touch screen component 118, when executed by the processor 106 of the mobile computing device 102, causes the processor 106 to display, to the user 104, the keyboard in the first partition of the touch screen 107. The touch screen component 118 further executes to display the ordered plurality of characters in the second partition of the touch screen 107. The touch screen component 118 further executes to receive, from the user 104, the sequence of touch screen inputs each intended by the user 104 to correspond to one of the displayed ordered plurality of characters. In some embodiments, the touch screen component 118 further determines the contact area associated with each of the received touch screen inputs.

In some embodiments, the touch screen component 118 includes a graphics card for displaying data to the user 104 and receiving data from the user 104. The touch screen component 118 may also include computer-executable instructions (e.g., a driver) for operating the graphics card. Further, the touch screen component 118 may include a display (e.g., the touch screen 107) and/or computer-executable instructions (e.g., a driver) for operating the touch screen 107.

The game component 120, when executed by the processor 106 of the mobile computing device 102, causes the processor 106 to visually alter each of the ordered plurality of characters in sequence when the contact area determined by the impression component overlaps with or is adjacent to the portion of the displayed keyboard associated with the corresponding character in the ordered plurality of characters. For example, if the user 104 presses the intended, expected key or any key adjacent to the intended, expected key, the game advances to the next character. In some embodiments, the game component 120 visually alters each of the ordered plurality of characters by causing each of the ordered plurality of characters to disappear in sequence.

The pattern component 122, when executed by the processor 106 of the mobile computing device 102, causes the processor 106 to overlay, on the displayed keyboard, the contact areas determined by the touch screen component 118 to display a user-specific touch model 116. For example, the contact areas may be displayed as an indication of game performance. The performance component 124, when executed by the processor 106 of the mobile computing device 102, causes the processor 106 to calculate a speed value and an accuracy value as the touch screen component 118 receives the sequence of touch screen inputs from the user 104.

Referring next to FIG. 3, an exemplary mobile computing device 302 with a touch screen 314 illustrates operation of a game for obtaining touch screen input data from the user 104. In the example of FIG. 3, a keyboard 312 is displayed towards the bottom of the touch screen 314, while an ordered plurality of characters 310 is displayed above the keyboard 312. In this example, the current ordered plurality of characters 310 is the word "atmosphere" and the next ordered plurality of characters 308 is the word "potential." In the top left portion of the touch screen 314, a running estimate of typing speed is displayed on a scale 306 (e.g., in words per minute or alternatively in characters per minute). In the top right portion of the touch screen 314, a running estimate of typing accuracy is displayed on another scale 304 (e.g., as a percentage). In some embodiments, accuracy is computed by dividing the quantity of direct hits by the total quantity of keystrokes. A progress bar is shown at the top of the touch screen 314 indicating progress by the user 104 in the game.

Figure 4:
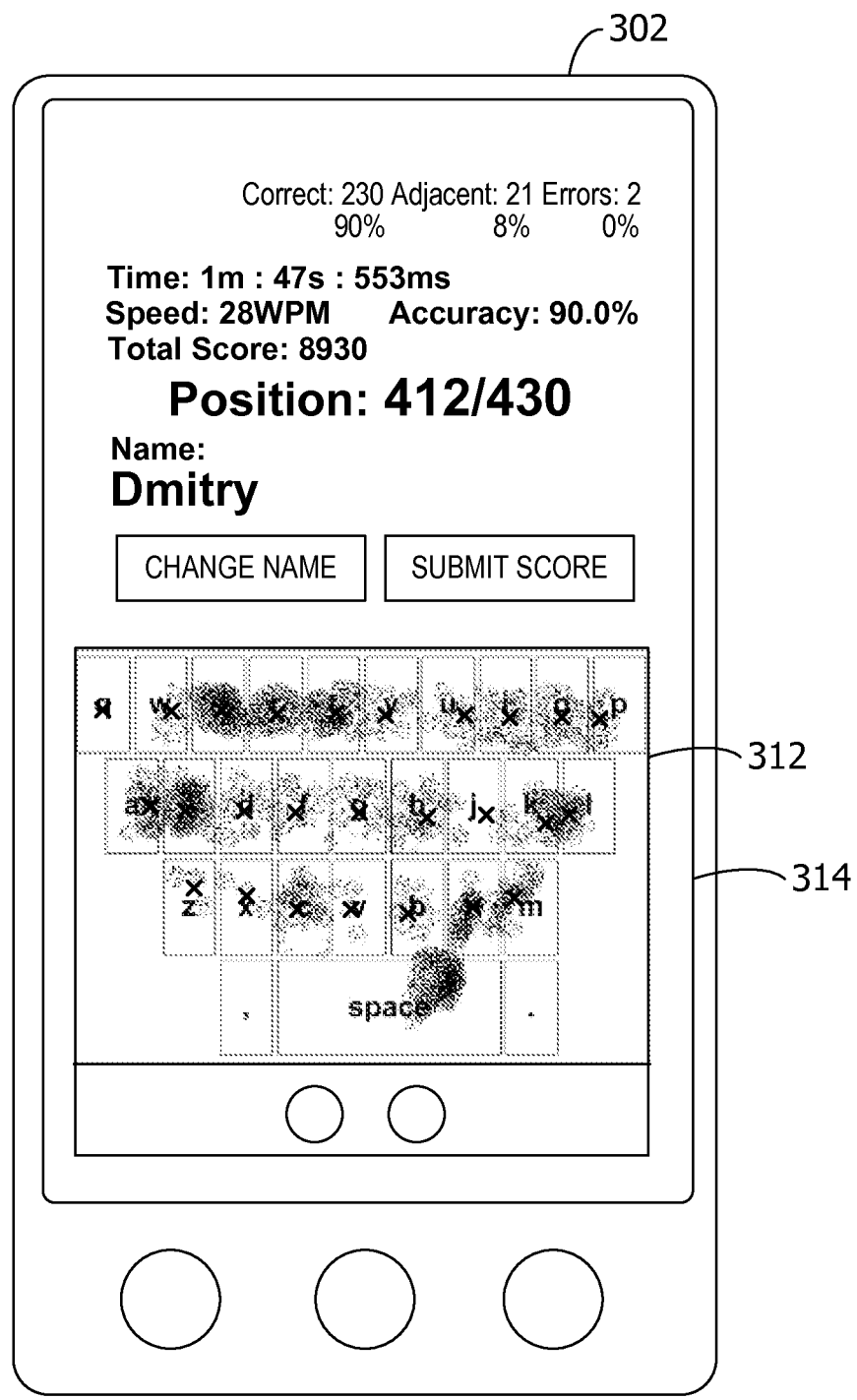
FIG. 4 is an exemplary mobile computing device with a touch screen illustrating completion statistics for a game.

Referring next to FIG. 4, the exemplary mobile computing device 302 with the touch screen 314 illustrates completion statistics for a game. In the example of FIG. 4, the keyboard 312 is displayed towards the bottom of the touch screen 314, while the completion statistics are shown towards the top of the touch screen 314. The exemplary completion statistics include an amount of time spent playing the game, a speed value, an accuracy value, a score value, and a name of the user 104. The speed value and accuracy value of the received sequence of touch screen inputs are calculated relative to each displayed ordered plurality of characters. Aspects of the disclosure generate the score based at least on the calculated speed value and calculated accuracy value. In some embodiments, additional information regarding the accuracy is provided such as a quantity of correctly typed words, how many adjacent characters were selected (rather than the intended characters), and how many errors were made. Embodiments of the disclosure may also use "achievements" or other rewards to contribute towards the score (e.g., as bonus points). Exemplary achievements include multi-touch typing (e.g., more than one finger touching the keyboard 312 at the same time), perfect accuracy, highest speed (e.g., per user 104, per day, per region, etc.), and the like.

In the example of FIG. 4, the contact areas determined by the game are displayed as an overlay to the keyboard 312. The contact areas appear as smudges of varying size and shape over the characters on the keyboard 312.

Figure 5:
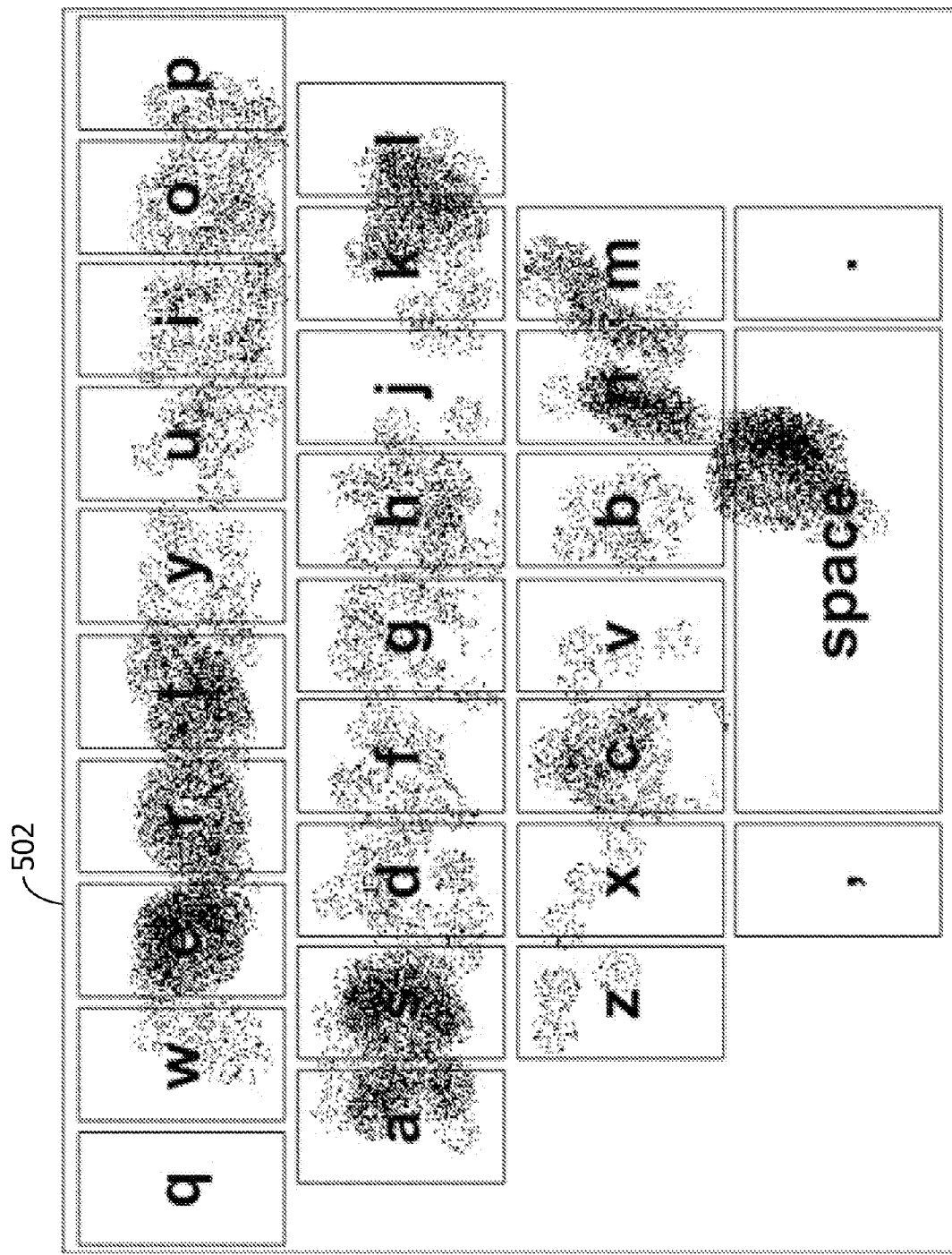
FIG. 5 is an exemplary touch screen keyboard with touch screen inputs overlaid thereon.

Referring next to FIG. 5, an exemplary touch screen keyboard 502 shows touch screen inputs overlaid thereon. In the example of FIG. 5, the darker contact areas indicate repeated presses at that location, while the lighter contact areas indicate fewer presses. Further, some contact areas are tightly grouped over the characters, while other contact areas are spread across each character indicating inconsistent presses at those locations. The map of accumulated touch points enables the user 104 and/or the mobile computing device 102 to identify areas for improvement.

In some embodiments, the contact areas are displayed to the user 104 at game completion. Alternatively or in addition, the contact areas may be displayed while the game is in progress.

While the contact areas are illustrated in grayscale in FIG. 5, alternative embodiments contemplate using color to identify each target key to identify which contact area was intended for which key.

Figure 6:
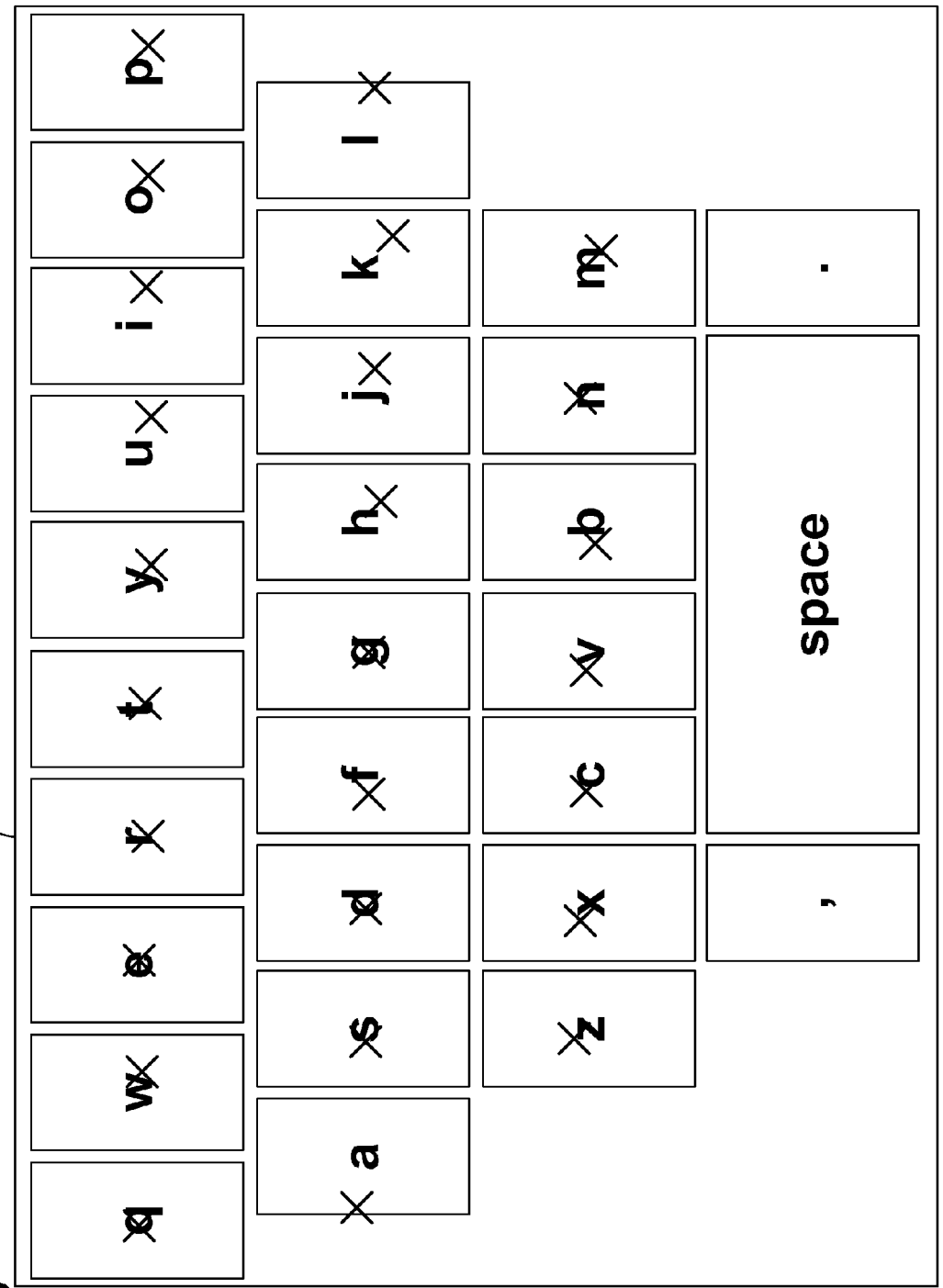
FIG. 6 is an exemplary touch screen keyboard with touch screen inputs averaged over each character on the keyboard.

Referring next to FIG. 6, an exemplary touch screen keyboard 602 shows touch screen inputs averaged over each character on the keyboard 602. In the example of FIG. 6, the contact areas have been analyzed to identify a central press location over each character involved in the game. The "X" over each character represents the center point of the contact areas for that character. In this manner, the user 104 is able to identify characters with high error rates.

Figure 7:
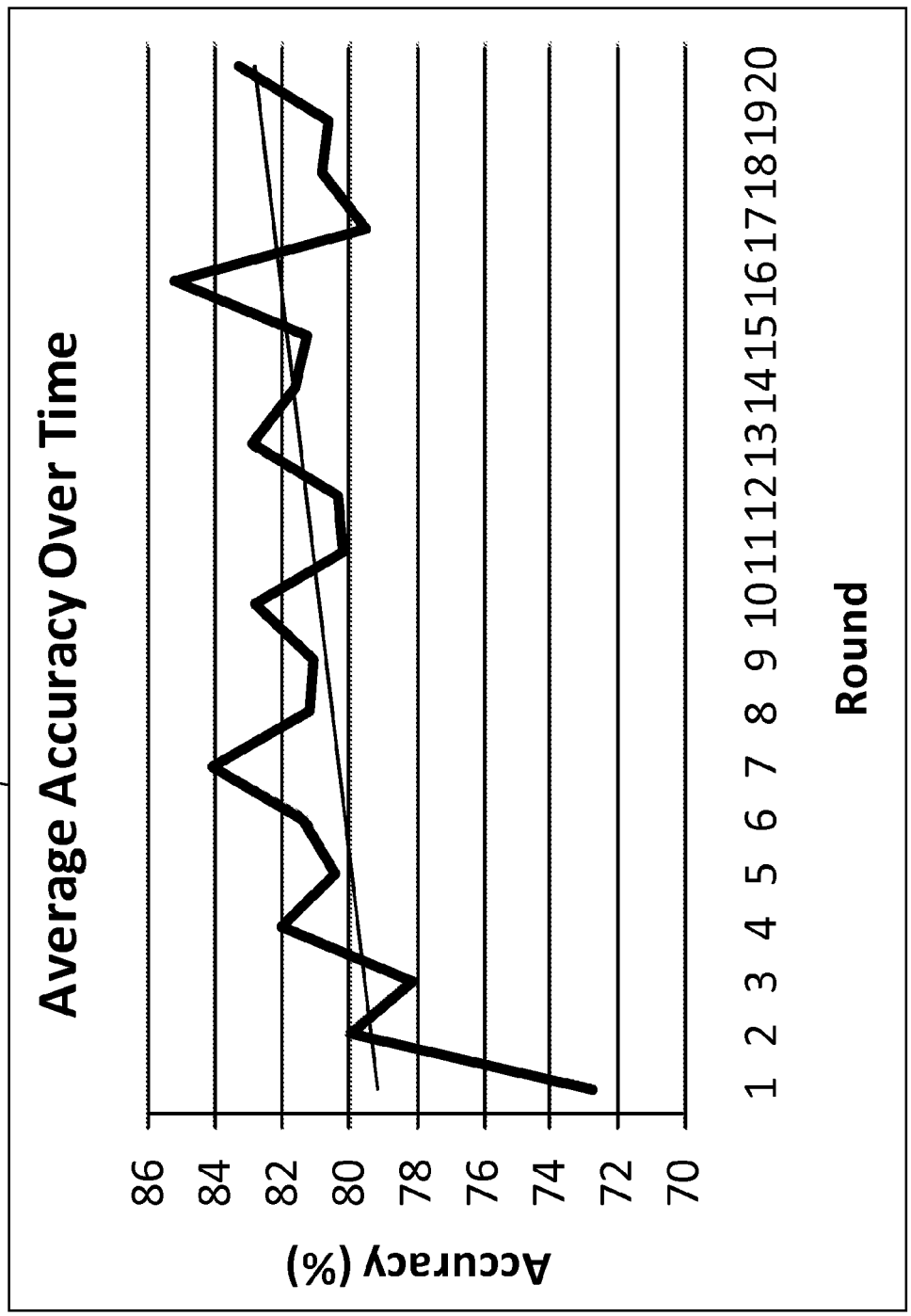
FIG. 7 is an exemplary graph illustrating an average accuracy over time as a user plays the game.

Referring next to FIG. 7, an exemplary graph 702 illustrates an average accuracy over time as the user 104 plays the game. In the example of FIG. 7, an accuracy value is displayed as a percentage on a vertical axis. Each round is displayed on a horizontal axis. The zigzag line graphs the actual accuracy value for each round. The straight line graphs the trend of the accuracy values, indicating that the accuracy values steadily increase as the user 104 plays additional rounds of the game.

Figure 8:
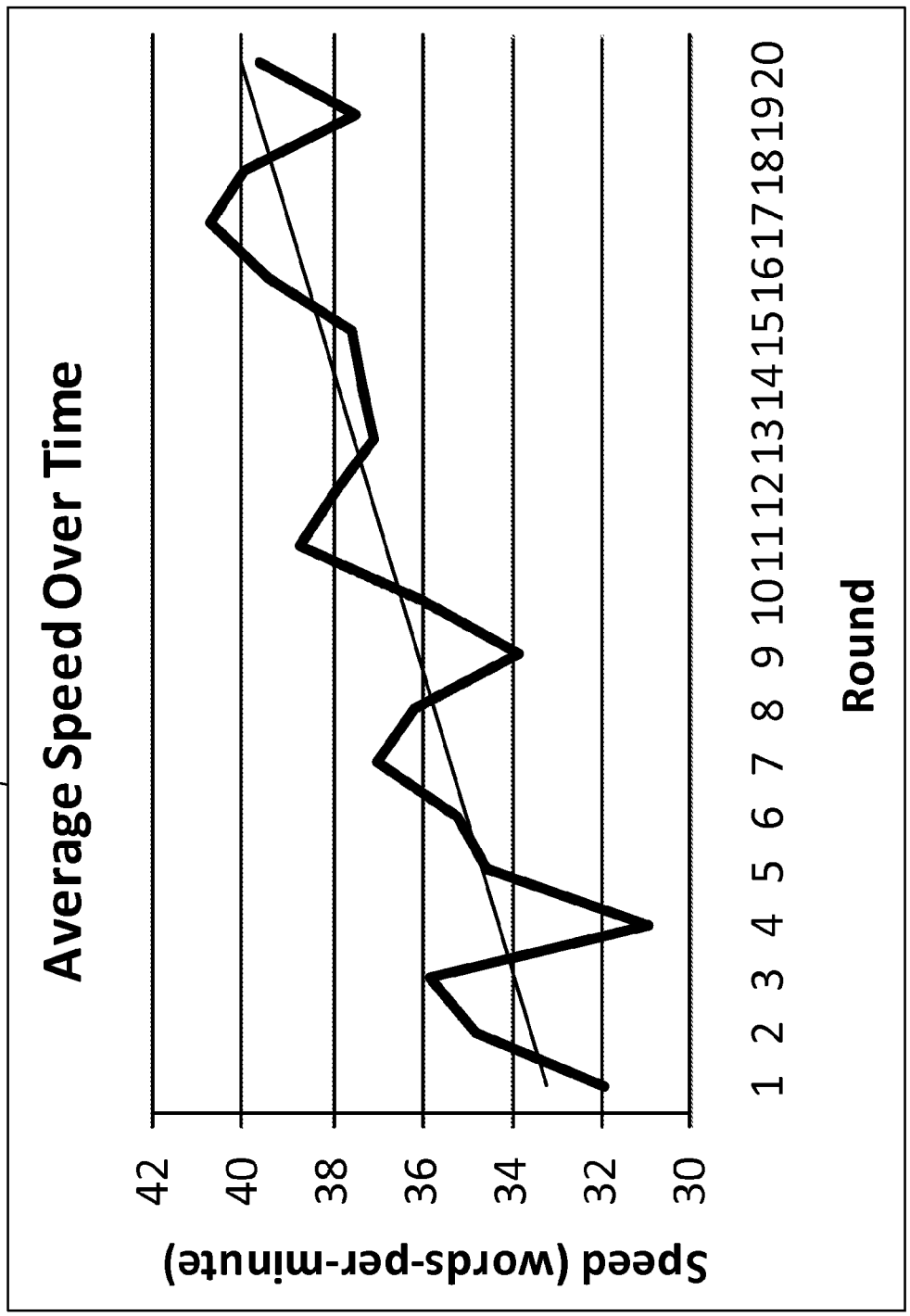
FIG. 8 is an exemplary graph illustrating an average speed over time as a user plays the game.

Referring next to FIG. 8, an exemplary graph 802 illustrates an average speed over time as the user 104 plays the game. In the example of FIG. 8, a speed value is displayed in words-per-minute on a vertical axis. Each round is displayed on a horizontal axis. The zigzag line graphs the actual speed value for each round. The straight line graphs the trend of the speed values, indicating that the speed values steadily increase as the user 104 plays additional rounds of the game.

Additional Examples

While aspects of the disclosure are described herein with respect to keyboards displayed on a touch screen of the mobile computing device 102 such as a mobile telephone, aspects of the disclosure are operable with physical keyboards (e.g., no touch screen). In some embodiments, the mobile computing device 102 detects only finger down events and finger up events. In such embodiments, the contact areas include the entire character pressed. The game advances to the next character when the intended character and an adjacent character are pressed. Aspects of the disclosure may be used for training button mashing algorithms.

In other embodiments, the mobile computing device 102 includes a physical keyboard where direction and pressure for each finger press are capable of being detected. In such embodiments, the contact area is defined by the character pressed, the direction of the press, and/or the pressure applied by the user 104.

While some aspects of the disclosure have been described with reference to the cloud service 126, other embodiments are used to customize the touch model for the user 104 without interacting with the cloud service 126. For example, the touch model may be adapted to the actual typing patterns of the user 104 based on the results of the game played by the user 104 on the computing device. Such embodiments improve the experience for the user 104 on the computing device on which the game has been played.

During exemplary game play, the ordered plurality of characters includes a word randomly selected from a corpus of 10,000 words. The corpus is based on email messages and transcribed voicemail messages, in this example, to include representative character sequences encountered in such data. When the user 104 touches the correct key (e.g., the intended key or an adjacent key), the corresponding displayed character explodes out then fades away. When the user 104 touches an incorrect key, the character turns red and a beep is sounded. To move to the next word, the user 104 touches the space bar.

Exemplary data collected during game play is included as Table A-1 in Appendix A.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent presented, for example, when the user 104 launches the game.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media. Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for conducting a game to obtain data to train the touch model 116 associated with the mobile computing device 102, and exemplary means for identifying areas for improvement based on the comparison between the determined contact areas and the portion of the displayed keyboard associated with the corresponding character in the ordered plurality of characters.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Exemplary data collected during game play is illustrated in Table A-1 below. In Table A-1, the fields at the top left identify the Username, Device Make, Device Model, Operating System Version, Firmware Version, Landscape/Portrait Mode, and Game Version. The subsequent data points take the following form:

<KeyUp/KeyDown, intended character, x, y, timestamp>

The intended character represents the target key, while the x, y values indicate a location of the touch point.

TABLE A-1

Exemplary Collected Game Play Data.

| | | |
|---|---|---|
| Player1 | 1,i,379,62,20760 | 1,i,356,68,55390 |
| SAMSUNG | 2,i,379,62,21450 | 2,i,365,84,56080 |
| SGH-i917 | 1,n,333,223,22840 | 1,1,432,139,57120 |
| 2103.10.10.1 | 2,n,339,232,23530 | 2,1,433,145,57820 |
| 3.1.0.7 | 1,g,251,130,23890 | 1, ,266,323,59190 |
| False | 2,g,245,132,24920 | 2, ,280,305,59890 |
| 3 | 1, ,265,330,25960 | 1,p,455,84,61270 |
| 1,a,56,163,0 | 2, ,266,326,26990 | 2,p,455,84,62310 |
| 2,a,56,163,680 | 1,p,456,105,28730 | 1,e,102,54,62310 |
| 1,p,462,59,1720 | 2,p,456,105,29420 | 2,e,102,54,63000 |
| 2,p,462,59,2410 | 1,e,200,79,30460 | 1,r,193,82,64040 |
| 1,p,454,70,3450 | 3,e,200,79,31150 | 2,r,193,87,64740 |
| 2,p,454,70,4140 | 1,e,103,84,33230 | 1,f,163,162,66120 |
| 1,r,193,49,4840 | 2,e,108,85,33930 | 2,f,163,162,66120 |

TABLE A-1-continued

Exemplary Collected Game Play Data.

| | | |
|---|---|---|
| 2,r,193,49,5180 | 1,t,220,55,35300 | 1,o,433,50,66120 |
| 1,o,444,15,5540 | 2,t,220,55,36000 | 2,o,433,50,66810 |
| 2,o,444,15,6570 | 1,t,192,51,37040 | 1,r,168,63,69240 |
| 1,v,273,242,7610 | 2,t,192,51,37380 | 2,r,168,63,69930 |
| 2,v,267,240,8300 | 1,y,271,36,38770 | 1,m,396,237,70620 |
| 1,a,39,151,9680 | 2,y,271,36,39460 | 2,m,396,237,71660 |
| 2,a,39,151,10730 | 1, ,263,324,41540 | 1,e,31,133,72010 |
| 1,1,452,148,10730 | 2, ,270,317,42570 | 3,e,31,133,72720 |
| 2,1,452,148,12110 | 1,y,262,43,45690 | 1,e,357,242,73390 |
| 1, ,279,320,13500 | 2,y,262,43,46390 | 3,e,357,242,74080 |
| 2, ,279,320,14180 | 1,e,126,75,47770 | 1,e,130,71,74430 |
| 1,r,164,72,15570 | 2,e,126,75,48460 | 2,e,130,71,75470 |
| 2,r,164,72,16260 | 1,p,459,54,49150 | 1, ,263,324,41540 |
| 1,i,392,76,17300 | 2,p,459,54,49850 | 2, ,270,317,42570 |
| 2,i,392,76,17990 | 2,m,401,224,54000 | DONE |

What is claimed is:

1. A system for obtaining data to train a touch model associated with a mobile computing device, said system comprising:
   a memory area associated with a mobile computing device, said memory area storing a user-specific touch model associated with the mobile computing device;
   a touch screen for receiving input; and
   a processor programmed to:
      display a keyboard in a first partition of the touch screen;
      display an ordered plurality of characters in a second partition of the touch screen, said ordered plurality of characters being a subset of characters of the displayed keyboard;
      receive a sequence of touch screen inputs, each input in the sequence intended to correspond to one of the displayed ordered plurality of characters and intended to be inputted in the same order as the displayed ordered plurality of characters;
      as each touch screen input is received,
         determine a contact area associated with each of the received touch screen inputs,
         compare each determined contact area to the portion of the displayed keyboard associated with the corresponding character in the ordered plurality of characters to define a distance, and
         visually alter display of the corresponding character based on a comparison of the defined distance with a threshold distance; and
      update the user-specific touch model stored in the memory area based on the determined contact area of each of the touch screen inputs.

2. The system of claim 1, wherein the second partition of the touch screen, displaying the ordered plurality of characters, is a part of the same touch screen that displays the keyboard in the first partition of the touch screen.

3. The system of claim 1, wherein the processor is further programmed to:
   calculate a speed and accuracy of the received sequence of touch screen inputs relative to the displayed ordered plurality of characters; and
   generate a score based at least on the calculated speed and accuracy.

4. The system of claim 1, wherein the displayed ordered plurality of characters comprises one or more of the following: a word, a phrase, a sentence, symbols, graphic elements, abbreviations, and emoticons.

5. The system of claim 1, wherein updating the user-specific touch model comprises adjusting a center of each character of the displayed keyboard based on the determined contact area of the touch screen input for the corresponding intended character.

6. The system of claim 1, wherein the processor is further programmed to identify entry characteristics for providing the sequence of touch screen inputs, said entry characteristics comprising one or more of the following: one finger input, two finger input, input while walking, input while sitting, and input while standing.

7. A method comprising:
displaying a key input layout in a first partition of a touch screen of a computing device;
displaying an ordered plurality of characters in a second partition of the touch screen before receiving touch screen input from the user, the ordered plurality of characters being a subset of characters of the displayed key input layout;
receiving a sequence of touch screen inputs each intended to correspond to one of the displayed ordered plurality of characters;
determining a contact area associated with each of the received touch screen inputs;
comparing each determined contact area to the portion of the displayed key input layout associated with the corresponding character in the ordered plurality of characters to define a distance;
visually altering display of the corresponding character based on a comparison of the defined distance with a threshold distance; and
defining a user-specific touch model associated with the computing device based on said comparing and said altering,
wherein the first partition and the second partition are on a same side of the computing device.

8. The method of claim 7, wherein the computing device has a manufacturer model number associated therewith, and wherein defining the user-specific touch model comprises altering a generic touch model associated with the manufacturer model number.

9. The method of claim 7, wherein determining the contact area comprises determining one or more of the following: an X-Y coordinate, a shape of a contact surface, a pressure reading, a key down event corresponding to a finger press, and a key up event corresponding to a finger release.

10. The method of claim 7, further comprising advancing to a next corresponding character in the ordered plurality of characters if the determined contact area overlaps and/or is adjacent to the portion of the displayed key input layout associated with the corresponding character.

11. The method of claim 10, wherein advancing to the next corresponding character comprises one or more of the following: removing display of the corresponding character from the touch screen, and visually distinguishing display of the next corresponding character from the other characters in the ordered plurality of characters.

12. The method of claim 7, further comprising:
calculating an accuracy of the received sequence of touch screen inputs relative to the displayed ordered plurality of characters; and
calculating a speed based on receipt of the received sequence of touch screen inputs and the calculated accuracy.

13. The method of claim 12, further comprising providing the ordered plurality of characters, corresponding determined contact areas, calculated speed, and calculated accuracy to a cloud service for analysis.

14. The method of claim 13, the cloud service aggregating, from a plurality of the computing devices, crowd-sourced data including the ordered plurality of characters, corresponding determined contact areas, calculated speed, and calculated accuracy, and analyzing the aggregated crowd-sourced data to determine an aggregate speed and an aggregate accuracy per make and model of the plurality of computing devices.

15. The method of claim 14, said cloud service analyzing the aggregated crowd-sourced data to identify problems per make and model of the plurality of computing devices and/or per user.

16. The method of claim 12, further comprising selecting another ordered plurality of characters based on the calculated accuracy to improve the calculated accuracy.

17. The method of claim 12, wherein the key input layout represents a first key input layout, wherein the defined user-specific touch model represents a first touch model, wherein the calculated accuracy and the calculated speed represent performance of the first key input layout and first touch model, and further comprising:
comparing the performance of the first key input layout and first touch model with performance of a second key input layout and a second touch model; and
defining a third key input layout based on said comparing.

18. One or more computing devices storing computer-executable components, said components comprising:
a touch screen component that when executed causes at least one processor to:
display a key input layout in a partition of a touch screen of a mobile computing device,
provide an ordered plurality of characters, each of said ordered plurality of characters having a portion of the displayed key input layout associated therewith,
receive a sequence of touch screen inputs each intended to correspond to one of the provided ordered plurality of characters, and
determine a contact area associated with each of the received touch screen inputs;
a game component that when executed causes at least one processor to visually alter each of the provided ordered plurality of characters in sequence when the contact area determined by the touch screen component overlaps with or is adjacent to the portion of the displayed key input layout associated with the corresponding character in the provided ordered plurality of characters; and
a pattern component that when executed causes at least one processor to overlay, on the displayed key input layout, the contact areas determined by the touch screen component to display a user-specific touch model.

19. The computing devices of claim 18, further comprising a performance component that when executed causes at least one processor to calculate a speed value and an accuracy value as the touch screen component receives the sequence of touch screen inputs from the user.

20. The computing devices of claim 18, wherein providing the ordered plurality of characters comprises displaying the ordered plurality of characters to the user, and wherein the game component visually alters each of the displayed ordered plurality of characters by causing each of the displayed ordered plurality of characters to disappear in sequence.

* * * * *